(12) United States Patent
Schnell et al.

(10) Patent No.: US 6,239,578 B1
(45) Date of Patent: May 29, 2001

(54) SYSTEM AND METHOD FOR PRESERVATION OF BATTERY POWER DURING RECONDITIONING

(75) Inventors: Arnold Thomas Schnell, Pflugerville; Shawn Joel Dube, Austin, both of TX (US)

(73) Assignee: Dell Products, L.P., a Texas Limited Partnership, Round Rock, TX (US)

( * ) Notice: Subject to any disclaimer, the term of this patent is extended or adjusted under 35 U.S.C. 154(b) by 0 days.

(21) Appl. No.: 09/604,242

(22) Filed: Jun. 27, 2000

(51) Int. Cl.$^7$ ....................................................... H02J 7/00
(52) U.S. Cl. .................................................................. 320/119
(58) Field of Search ........................................ 329/119, 139, 329/131, 128, 127

(56) References Cited

U.S. PATENT DOCUMENTS

| | | | |
|---|---|---|---|
| 3,997,830 | 12/1976 | Newell et al. | 320/102 |
| 4,084,124 | 4/1978 | Kapustka | 320/131 |
| 4,691,158 | 9/1987 | Hashimoto et al. | 320/131 |
| 4,734,635 | 3/1988 | Theobald | 320/114 |
| 4,829,225 | 5/1989 | Podrazhansky et al. | 320/129 |
| 5,488,282 | 1/1996 | Hayden et al. | 320/118 |
| 5,572,660 | 11/1996 | Jones | 714/6 |
| 5,600,227 | 2/1997 | Smalley | 320/129 |
| 5,652,497 | 7/1997 | Boivie | 320/128 |
| 5,891,590 | 4/1999 | King | 429/49 |
| 5,998,968 | 12/1999 | Pittman et al. | 320/130 |

FOREIGN PATENT DOCUMENTS

| | | | | |
|---|---|---|---|---|
| WO 98/26490 | 6/1998 | (WO) | | H02J/7/00 |
| WO 98/31088 | 7/1998 | (WO) | | H02J/7/10 |

OTHER PUBLICATIONS

Patent Abstracts of Japan, http://www.patents.ibm.com, JP62264573, Nov. 17, 1987.
Patent Abstracts of Japan, http://www.patents.ibm.com, JP1095569, Apr. 13, 1989.
Patent Abstracts of Japan, http://www.patents.ibm.com, JP1097139, Apr. 14, 1989.
Patent Abstracts of Japan, http://www.patents.ibm.com, JP4347543, Dec. 02, 1992.
Patent Abstracts of Japan, http://www.patents.ibm.com, JP5227671, Sep. 03, 1993.

*Primary Examiner*—Peter S. Wong
*Assistant Examiner*—Pia Tibbits
(74) *Attorney, Agent, or Firm*—Baker Botts L.L.P.

(57) ABSTRACT

A battery reconditioning circuit for a computer system is disclosed. The battery reconditioning circuit comprises a battery charger, a battery reconditioner and at least two sets of batteries. While one set of batteries is being reconditioned by the battery charger and the battery reconditioner, at least one set of batteries remains connected to the load. Therefore, even if the computer system suffers power loss while one set of batteries is being reconditioned, there is at least one battery available to provide backup power.

24 Claims, 2 Drawing Sheets

SYSTEM AND METHOD FOR PRESERVATION OF BATTERY POWER DURING RECONDITIONING

BACKGROUND OF THE INVENTION

A memory cache, also known as a cache store or RAM cache, is a portion of memory comprised of high-speed static RAM (SRAM) instead of the slower dynamic RAM (DRAM) that is used for main memory. Computer systems use memory caching because many programs tend to repeatedly access the same data or instructions. By storing this frequently accessed information in SRAM, the computer system exhibits enhanced performance characteristics because the computer system avoids the necessity of repeatedly accessing the slower DRAM. Some memory caches are built into the architecture of microprocessors themselves. For example, conventional microprocessors may contain an internal 8K or 16K memory cache. Such internal caches are often called Level 1 (L1) caches. Many computer systems also come with external cache memory, called a Level 2 (L2) caches. Level 2 caches are often located between the CPU and the DRAM. Like L1 caches, L2 caches are composed of SRAM. L2 caches are typically much larger than L1 caches.

Disk caching works under the same principle as memory caching. The most recently accessed data from the disk (as well as adjacent sectors) is stored in a RAM memory buffer. When a program needs to access data from the disk, it first checks the disk cache to see if the data is there. Disk caching can dramatically improve the performance of applications, as accessing data in RAM can be many times faster than accessing data on a hard disk.

Write-back caching, or copy-back caching, is a caching method in which modifications to data in the cache are not copied to the cache source, such as the original data or the main memory, until absolutely necessary. For microprocessor that support write-back caching, data modifications or write operations to data stored in the L1 cache are not immediately copied to main memory or original data. Instead, the modified data is marked, and the main memory or original data is changed when the cached data is deallocated. In contrast, a write-through cache performs all write operations in parallel—data is written to main memory and the L1 cache simultaneously. Write-back caching yields better performance than write-through caching because it reduces the number of write operations to main memory. However, despite the performance advantage of write-back caching, write-back caching carries with it the risk of data loss in event of a system crash or sudden loss of power. Generally, when the system crashes or experiences a power loss, the operating system has a recovery method that assumes that key data was written to the disk. But if the computer system suffers a sudden loss of power before the system can copy the cache to the disk, then the operating system recovery method will not be effective in restoring the lost cached data. Thus, any information that is not actually on the disk or protected by a battery backup will be lost.

Some computer systems employ a battery backup circuit as an auxiliary source of power for use in situations when the main power has been shut off or lost. A battery may also be used to provide power to the computers internal clock/calendar and to the circuitry responsible for that part of RAM that stores important system information. A battery may also be incorporated in an uninterruptible power supply (UPS) device. A UPS device is a device that contains both a battery and a loss-of-power sensor and is electrically coupled to both the computer system and the power supply. When the UPS unit detects a loss of power, it switches over to the battery so that the user is provided with a temporary source of power.

Batteries, such as NiCad batteries, may be prone to the memory effect. Memory effect refers to the tendency for a battery to lose its capacity for full recharging if it is repeatedly discharged at the same amount and then recharged without overcharge before being fully drained. The battery then exhibits a diminished capacity, or memory, for the amount of charging it can subsequently sustain. In order to avoid this memory effect and to maximize battery performance and life, batteries are periodically reconditioned. Reconditioning, or deep cycling, a battery involves completely draining a battery to its lowest state and then fully recharging it. Reconditioning helps offset the chemical reactions that cause the memory effect. In some cases, if the battery is not properly charged, even reconditioning will not enable the battery to charge to its full capacity. Due to improvements in their chemical makeup, modern battery models based on NiMHi (Nickel Metal Hydride) chemistry do not exhibit the same memory effect of older NiCad battery models. While modem batteries are less susceptible to this memory effect, it is still advisable to recondition batteries every six months because, even though the battery is generally not used, its capacity will drift away from its full capacity. Reconditioning will bring the battery back to its full capacity.

Many products provide utilities that allow the user to specify reconditioning periods. For example, a utility may allow for the setup of an interval period of six months and prompt the user when this interval elapses. Typically, the user must then enter the utility and either postpone or initiate the reconditioning process. One drawback of reconditioning is that the reconditioning process has an adverse impact on the data integrity of the computer system. In the conventional reconditioning process, the battery in the battery circuit used as a backup power source is electrically decoupled from the load while it is being deep-cycled. Because the battery cannot supply power to the load during the reconditioning process, the load must be supplied from sources that are dependent upon AC power. If AC power is lost during the reconditioning process, then the load cannot be supplied. As a result, the computer system will lose any data that is stored in volatile memory, such as a memory cache.

In mission-critical or continuous computer systems, such as servers that are intended to operate continuously, this risk is not acceptable. Therefore, it is a general practice in mission-critical applications for the computer system to employ write-through caching rather than write-back caching. As discussed above, write-through caching writes in parallel and thereby minimizes the risk that data changes will be lost in the event that AC power is lost while the battery is unavailable. Unfortunately, systems employing write-through caching incur a performance loss in comparison with those utilizing write-back caching.

The battery reconditioning process typically takes several hours. The length of time may vary depending on the charge rate of the battery charger. Because the process of charging a battery generates a substantial amount of heat, the charge time is typically determined based on the rise in battery temperature for a fixed charge rate and the worst case ambient temperature tolerated by the computer system. It is undesirable to charge the battery too quickly because the additional heat that is generated by this process may damage those computer components that are already close to their maximum operating temperature. As a result, the battery reconditioning process may take up to eight hours. This is an undesirably long period of time to operate a server in the slower write-through mode.

SUMMARY OF THE INVENTION

In accordance with teachings of the present disclosure, a system and method is disclosed for reconditioning batteries that substantially eliminates or reduces the disadvantages associated with conventional reconditioning circuits or methods of reconditioning batteries.

The battery reconditioning circuit of the present invention comprises two or more groups of battery cells, circuitry for reconditioning the battery cells, circuitry for charging the battery cells, switches that allow one group of battery cells to be reconditioned or charged while the other groups of battery cells are connected to the load, and control logic circuitry to govern the operation of the switches.

The logic circuit disconnects one selected group of cells from the circuit and allows the other groups of cells to be connected to the circuit. The remaining groups of cells are designed to be sufficient to meet the voltage requirements of the load. The logic circuit electrically couples the selected group of cells to the reconditioning circuitry. Once the selected group of cells has been reconditioned, the logic circuit electrically couples the selected group to the charger to replenish the charge of the selected group of cells. Once the selected group of cells has completed the reconditioning process, the logic circuit reconnects the selected group of cells back into the circuit.

A technical advantage of the present invention is that batteries may be reconditioned while the computer system maintains a high level of performance and assurance against data loss in the event of a power outage. Because only one set of batteries is being reconditioned at any given time, the other batteries may remain connected to the circuit. If a power outage occurs while a battery is being reconditioned, the computer system may rely on the batteries that are not being reconditioned for auxiliary power. As a result, the computer system may continue to use write-back caching during the reconditioning process.

Other technical advantages of the present invention will be readily apparent to one skilled in the art from the following figures, descriptions, and claims.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION OF THE INVENTION

Figure 1:
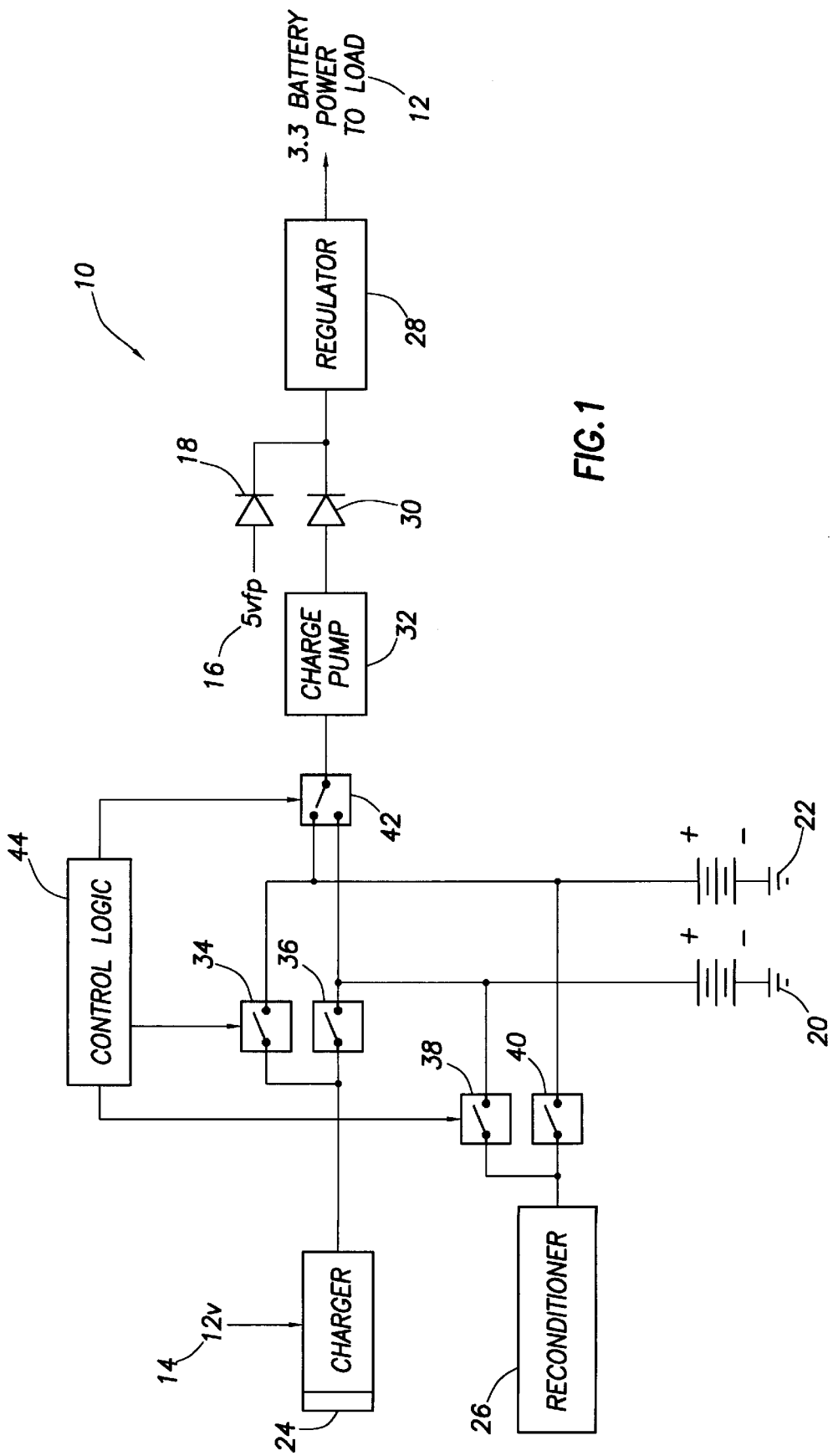
FIG. 1 a circuit diagram of the battery reconditioning circuit of the present invention.

Shown in FIG. 1 is a battery switching and reconditioning circuit 10. Circuit 10 is coupled to load 12. Load 12 is the load of the computer system that is to remain operational in the event of a loss of AC power to the computer system. A 12 V and a 5 V flea power voltage potential, shown at 14 and 16 respectively, are both derived from the main power supply of the computer system. The 5 V flea power is electrically coupled to diode 18. Circuit 10 also includes batteries 20 and 22, battery charger 24, and battery reconditioner 26. The 12 V power is electrically coupled to battery charger 24. Batteries 20 and 22 may be any device suitable for transforming chemical energy to electrical energy, such as a NiCad, NiMHi, or Li based battery, and delivering that electrical energy to a computer system. Batteries 20 and 22 each include a plurality of cells that are electrically connected for producing electrical energy. A typical battery for a computer system comprises 5 AA-size cells with a collective nominal voltage of 6 volts.

Battery charger 24 may be electrically coupled to battery 20 or 22 for the purpose of recharging battery 20 or 22. Battery charger 24 is any circuit suitable for converting electrical energy into chemical energy within the cells of battery 20 or 22 by maintaining a unidirectional current in the cells of battery 20 or 22 in the direction opposite the direction of the current during the discharge of battery 20 or 22. Generally, battery charger 24 has two modes of operation: fast charge or trickle charge. Fast charge is used to quickly supply current into battery 20 or 22. One disadvantage of using the fast charge rate is that this process tends to generate a significant amount of heat. The fast charge rate is usually adjusted to balance charge duration with heat generation. Typically, when battery charger 24 is not in fast charging mode, it is trickle charging battery 20 or 22 by default. This trickle charge mode generally supplies 10–20 mA to battery 20 or 22 to keep it fully charged. Even during the reconditioning process, the battery charger 24 remains in trickle charge mode, though it might be substantially overwhelmed by the drain current invoked by reconditioner 26.

Battery reconditioner 26 may be electrically coupled to battery 20 or 22 for the purposes of reconditioning battery 20 or 22. Battery reconditioner 26 is any circuit suitable for discharging battery 20 or 22 and thereby draining the charge present in battery 20 or 22 and taking battery 20 or 22 to its lowest state. For example, battery reconditioner 26 may operate by connecting a resistive load to battery 20 or 22 in order to drain the battery. The desired discharge rate is used to determine the size of the resistive load used by the battery reconditioner 26. Because batteries heat up during discharge as with charging, the discharge rate must be limited to avoid exceeding the maximum operating temperature of battery 20 or 22 and other computer components.

Regulator 28, which is coupled to diodes 18 and 30, supplies a constant voltage level to load 12. Although the power supply of most computer systems can supply a voltage level of five volts, the voltage level is often stepped down by a regulator before being supplied to the system load, such as a microprocessor, which may take a voltage below 3.5 volts for operating power. Because the battery voltage can vary widely depending on the battery's charge level, regulator 28 may be used to step down the voltage supplied to the load through diodes 18 and 30. In the event that the voltage level applied to diode 30 is insufficient to deliver a sufficient voltage level to regulator 28, a charge pump 32 may increase the voltage supplied to diode 30. Charge pump 32 may be any variety of voltage multiplier.

Circuit 10 also includes a control logic circuit 44 and switches 34, 36, 38, 40, and 42. Control logic 44 is coupled to an input node of switches 34, 36, 38, 40, and 42. When either switch 34 or 36 is closed, charger 24 is coupled to battery 22 (when switch 34 is closed) or battery 20 (when switch 36 is closed). When either switch 38 or 40 is closed, battery reconditioner 26 is electrically coupled to battery 20 (when switch 38 is closed) or battery 22 (when switch 40 is closed). The electrical coupling of reconditioner 26 with either of battery 20 or battery 22 discharges the battery. During normal operation, i.e., when neither battery 20 nor 22 is being reconditioned and AC power is being supplied to load 12 indirectly through voltage source 16, control logic 44 may close switches 34 and 36 to trickle charge batteries 22 and 20. Depending on the design of battery charger 24, control logic 44 may instead alternate closure of switches 34 and 36 in order to trickle charge batteries 20 and 22 one at a time. For example, battery charger 24 may be designed to charge a fixed number of cells. During normal operation, neither battery is being reconditioned and therefore switches 38 and 40 are open. Switch 42 may be set to either the "high" or "low" position as long as one battery, either 20 or 22, is connected to load 12 in the event of AC power loss. If switch 42 is set high then battery 22 is connected to load 12. If switch 42 is set low then battery 20 is connected to load 12. In the event that one battery is not sufficient to power regulator 28, charge pump 32 may be incorporated into circuit 10 to increase the power voltage to regulator 28. Regulator 28 guarantees that the voltage to load 12 is constant.

System administrators prefer to recondition, or deep-cycle, batteries every six months. Batteries must be regularly reconditioned because batteries left in their charged state gradually deteriorate and lose their ability to maintain a full charge. The system administrator may choose to recondition either battery 20 or battery 22. In order to recondition battery 20, battery 20 must first be drained and then recharged. During the first phase, when battery 20 is being drained, switches 34 and 38 must be closed. This allows battery 22 to be trickle charged by battery charger 24 while battery 20 is being drained by battery reconditioner 26. In order to fully realize the benefits of the reconditioning process, it is preferable to completely discharge battery 20 to its lowest state. Because power must be supplied to load 12 in the event of AC power loss, switch 42 must be set to the high position to connect battery 22, the battery that is not being reconditioned, to regulator 28.

After battery 20 has been completely drained, battery 20 must then be recharged. During this second phase of reconditioning, switches 34 and 38 are opened, and switch 36 is closed to connect battery charger 24 to battery 20. It is preferable to completely recharge battery 20. Switch 42 remains in the high position so that battery 22 can remain as a backup power source. At the end of this charging phase, if battery charger 24 had been set to fast charge, it automatically drops from fast charge mode to trickle charge mode. Control logic 44 may then close or open switches 34 and 36 to keep both batteries 20 and 22 charged.

In order to recondition battery 22, battery 22 must also be drained and then recharged. Switches 36 and 40 are closed and switches 34 and 38 are open during the first phase of reconditioning. This allows battery 20 to be trickle charged while battery 22 is being drained. Switch 42 is set to the low position to connect battery 20 to regulator 28 in case of AC power failure. During the second phase of reconditioning battery 22, switch 40 is opened, and switch 34 is closed to connect battery charger 24 to battery 22. If battery charger 24 can only charge one battery at a time, then switch 36 may be opened. Switch 42 remains in the low position to continue to use battery 20 for backup power support. After battery 22 has been recharged, control logic 44 may then close or open switches 34 and 36 to keep both batteries 20 and 22 charged.

Circuit 10 may be implemented in any electronic device that may rely on batteries. For example, circuit 10 may be implemented on a portable memory card such as a transportable cache with its own integrated and reliable battery power source. Circuit 10 may also be implemented in a RAID controller card or in any other card having local batteries that require regular reconditioning. Reconditioning and switching circuits like the one disclosed herein any be used in many applications in which periodic reconditioning and continuous operation are both necessary. Examples of such applications include servers systems, computerized medical equipment, and computerized security access systems. Although FIG. 1 depicts an embodiment of the present invention that uses two batteries, the present invention is not limited to two batteries. Depending on load 12, circuit 10 may use more than two batteries. For example, circuit 10 may use two banks of batteries, wherein each bank comprises several batteries which cumulatively supply current to load 12. Alternatively, circuit 10 may comprise three or more batteries depending on the voltage capacity of the batteries and the requirement of load 12.

Figure 2:
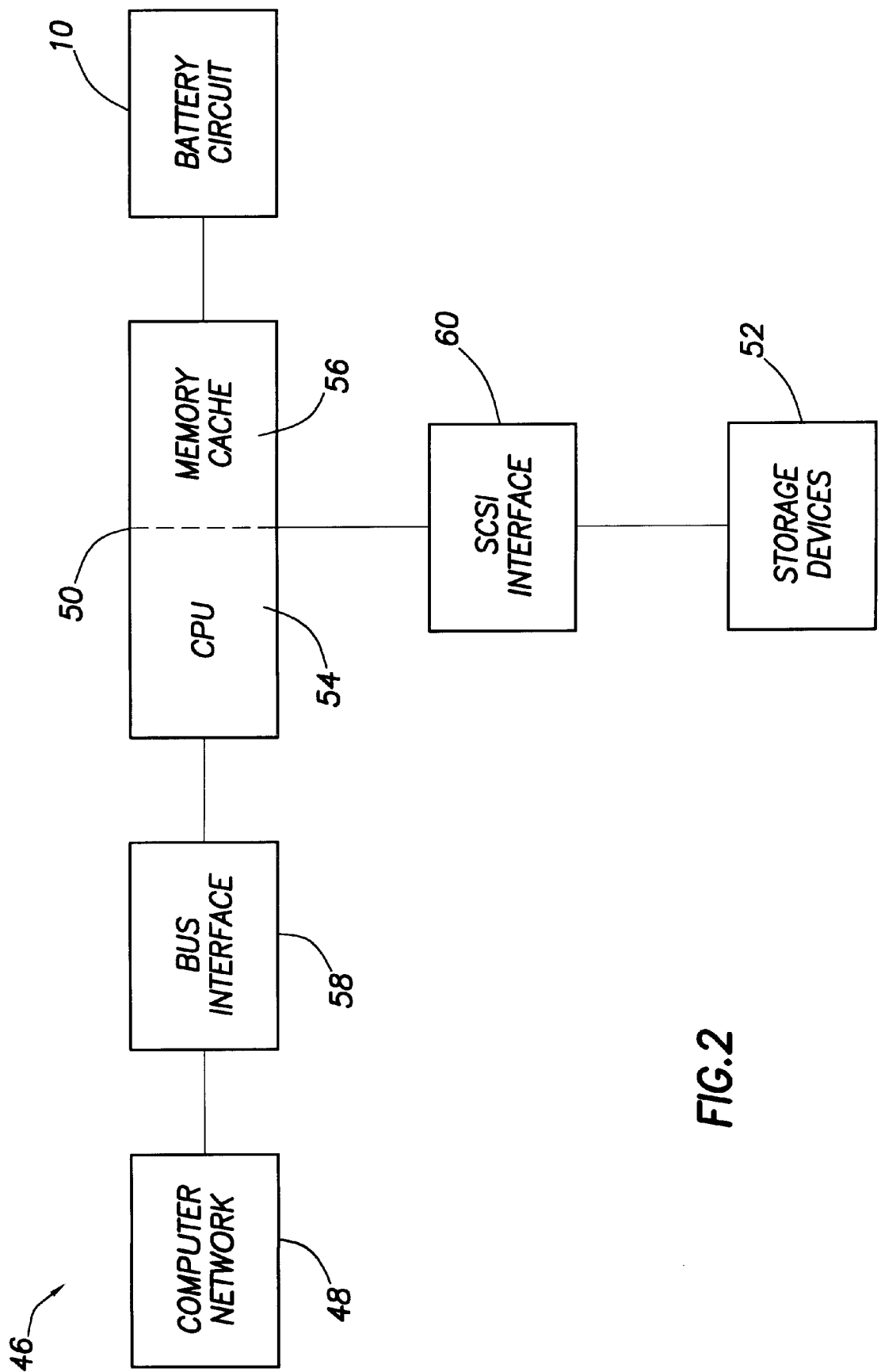
FIG. 2 is a system-level diagram of a computer system having the battery reconditioning circuit of the present invention as a backup power supply.

FIG. 2 depicts a computer system or network, shown generally at 46, that implements the battery reconditioning circuit of the present invention. Computer system 46 comprises computer network 48, RAID controller 50 and storage devices 52. Computer network 48 is any server system, LAN, WAN, or similar network of computers. RAID controller 50 acts as an interface between computer network 48 and storage devices 52 to allow storage devices 52 to be shared in a RAID configuration between the networked computers comprising computer network 48. RAID controller 50 comprises microcontroller CPU 54 and memory cache 56. CPU 54 is used for the processing operations of the RAID subsystem. Memory cache 56 is used for the caching operations of the RAID subsystem. Bus interface 58 allows RAID controller 50 to communicate with computer network 48. For example, bus interface 58 may be a PCI interface or other computer I/O bus structure device. SCSI interface 60, which is typically a SCSI protocol or Fibre Channel device, allows RAID controller 50 to communicate with storage devices 52. Battery circuit 10 provides backup power for memory cache 56 in the event that the AC power source is interrupted.

As discussed above, RAID controller 50 uses two distinct types of write caching. With write-through caching, the RAID controller 50 does not acknowledge the completion of the write operation until the data is written to the storage devices 52. In write-back caching, the RAID controller 50 signals that the write request is complete after the data is stored in memory cache 56 but before the data is written to storage devices 52. Write-back caching has improved performance relative to write-through caching because the application program can resume while the data is being written to storage devices 52. However, if the AC power source is interrupted, any information in memory cache 56 is lost. For this reason, it is necessary for the use of a battery or UPS to provide backup system power to ensure data integrity of the RAID array. Battery circuit 10 supplies power to memory cache 56 in the event of the loss of power to memory cache 56, even if the battery circuit 10 is being reconditioned at the time the sudden loss of battery power occurs. Therefore, RAID controller 50 can remain in write-through mode continuously, regardless of whether a battery in battery circuit 10 is being reconditioned.

There are several major benefits to this arrangement. One advantage is that while one set of batteries is being reconditioned, the other sets of batteries remain electrically coupled to the load. Because at least one set of batteries remains connected to the load, power can be supplied to the load during the reconditioning process even in the event of AC power loss. Because the additional sets of batteries provide this safeguard in the event of AC power loss, the computer system can remain in write-back mode without the risk of losing data changes. As a result, the computer system can recondition batteries without the loss in performance associated with conventional reconditioning circuits.

The disclosed system and method is also advantageous becase it allows for the automation of the reconditioning process. Because the battery reconditioning process is no longer detrimental to performance, the computer system need not notify the system administrator prior to initiating a recondition of a battery. Thus, the computer system may automatically recondition a battery whenever it is necessary, leaving the system administrator free to allocate his decision-making resources elsewhere.

Although the disclosed embodiments have been described in detail, it should be understood that various changes, substitutions and alterations can be made to the embodiments without departing from their spirit and scope.

What is claimed is:

1. A circuit for supplying battery voltage power to a load comprising:
   a plurality of batteries;
   a battery charger circuit suitable for supplying current to at least one of the batteries to charge the battery;
   a battery reconditioning circuit suitable for draining current from at least one of the batteries to discharge the battery; and
   a plurality of switches wherein a state of the switches may be changed such that at least one battery is electrically coupled to the load, while at least another battery may be electrically coupled to the battery charging circuit or the battery reconditioning circuit.

2. The circuit of claim 1, further comprising a regulator to decrease the voltage power delivered to the load.

3. The circuit of claim 1, further comprising a control logic circuit electrically coupled to the switches, wherein the control logic circuit can change the states of the switches.

4. The circuit of claim 1, further comprising a memory component.

5. The circuit of claim 4, wherein the memory component is a DIMM.

6. The circuit of claim 1, further comprising a RAID controller.

7. The circuit of claim 1, further comprising a charge pump to increase the voltage power delivered to the load.

8. A computer system comprising:
   a system component;
   a plurality of batteries;
   a battery charging circuit suitable for supplying current to at least one of the batteries to charge the battery;
   a battery reconditioning circuit suitable for draining current from at least one of the batteries to discharge the battery; and
   a plurality of switches wherein a state of the switches may be changed such that at least one battery is electrically coupled to a load of the system component, while at least another battery may be electrically coupled to the battery charging circuit or the battery reconditioning circuit.

9. The computer system of claim 8, further comprising a regulator to decrease a voltage power delivered to the load.

10. The computer system of claim 8, further comprising a control logic circuit electrically coupled to the switches wherein the control logic circuit can change the states of the switches.

11. The computer system of claim 8, wherein the computer system is a server system.

12. The computer system of claim 8, wherein the system component is a memory cache of a RAID subsystem.

13. The computer system of claim 12, wherein the RAID subsystem employs write-back caching while at least one battery is electrically coupled to the load and at least another battery is electrically coupled to the battery charging circuit or the battery reconditioning circuit.

14. The computer system of claim 8, wherein every battery that is not electrically coupled to the battery reconditioning circuit is electrically coupled to the battery charging circuit.

15. The computer system of claim 8, wherein a specified number of batteries that can collectively provide sufficient voltage to the load are always electrically coupled to the load.

16. The computer system of claim 8, further comprising a charge pump to increase the voltage power delivered to the load.

17. The computer system of claim 8, further comprising a utility program wherein the utility program notifies a user of the computer system when a battery has not been reconditioned for a predetermined amount of time.

18. The computer system of claim 8, further comprising a utility program wherein the utility program automatically couples the battery that has not been reconditioned for a predetermined amount of time to the battery reconditioning circuit until the battery has been drained and then subsequently electrically couples the battery to the battery charging circuit until the battery has been charged.

19. A method for providing auxiliary backup power to a load while reconditioning bank of batteries comprising the steps of:
   providing a first battery bank comprising one or more batteries;
   providing a second battery bank comprising one or more batteries;
   providing a battery charger circuit suitable for supplying current to at least one bank of batteries to charge the batteries therein;
   providing a battery reconditioning circuit suitable for draining current from at least one bank of the batteries to discharge the batteries therein;
   providing a plurality of switches wherein a state of the switches may be changed such that at least one bank of batteries is electrically coupled to the load, while at least another bank of batteries may be electrically coupled to the battery charging circuit or the battery reconditioning circuit;
   changing the states of the switches such that the first bank of batteries is electrically coupled to the load;
   changing the states of the switches such that the second bank of batteries is electrically coupled to the battery reconditioning circuit;
   draining the charge from the second bank of batteries;
   changing the states of the switches such that the second bank of batteries is coupled to the battery charging circuit instead of to the battery reconditioning circuit; and
   charging the second bank of batteries.

20. The method of claim 19, further comprising a step of providing a regulator to decrease the voltage power delivered to the load.

21. The method of claim 19, further comprising a step of providing a control logic circuit electrically coupled to the switches, wherein the control logic circuit can change the states of the switches.

22. The method of claim 19, further comprising a step of providing a charge pump to increase the voltage power delivered to the load.

23. The method of claim 19, further comprising a step of providing notice to a user that a bank of batteries is being reconditioned.

24. The method of claim 19, wherein the method is automatically initiated when a battery has not been reconditioned for a predetermined amount of time.

* * * * *